United States Patent
Fu

(10) Patent No.: US 10,445,486 B2
(45) Date of Patent: Oct. 15, 2019

(54) METHOD AND APPARATUS FOR AUTHORIZED LOGIN

(71) Applicant: Alibaba Group Holding Limited, George Town (KY)

(72) Inventor: Xiaozhen Fu, Zhejiang (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/380,395

(22) Filed: Apr. 10, 2019

(65) Prior Publication Data
US 2019/0236263 A1    Aug. 1, 2019

Related U.S. Application Data

(63) Continuation of application No. PCT/CN2017/113555, filed on Nov. 29, 2017.

(30) Foreign Application Priority Data

Dec. 8, 2016    (CN) .......................... 2016 1 1124494

(51) Int. Cl.
*G06F 21/36*    (2013.01)
*G06F 21/33*    (2013.01)
(Continued)

(52) U.S. Cl.
CPC .......... *G06F 21/36* (2013.01); *G06F 3/0482* (2013.01); *G06F 3/0486* (2013.01);
(Continued)

(58) Field of Classification Search
CPC ...................................................... G06F 21/36
(Continued)

(56) References Cited

U.S. PATENT DOCUMENTS

| 7,624,351 B2 * | 11/2009 | Unger ................... G06F 3/0481 715/762 |
| 8,417,642 B2 * | 4/2013 | Oren ....................... G06F 21/31 705/64 |

(Continued)

FOREIGN PATENT DOCUMENTS

| CN | 103188237 | 7/2013 |
| CN | 104113533 | 10/2014 |

(Continued)

OTHER PUBLICATIONS

International Search Report and Written Opinion issued in International Application No. PCT/CN2017/113555 dated Feb. 24, 2018, 9 pages (with English translation).

(Continued)

*Primary Examiner* — Dant B Shaifer Harriman
(74) *Attorney, Agent, or Firm* — Fish & Richardson P.C.

(57) ABSTRACT

Techniques for processing user logins are described. One example method includes receiving a first user input to zoom out a first application, wherein the first application is displayed on a first area of a screen of a device; zooming out the first application to be displayed on a second area of the screen; and displaying an icon of a second application on a third area of the screen, wherein a user has logged into the second application on the device; receiving a second user input to drag the displayed icon of the second application from the third area to the second area; transmitting login authorization information of the second application to the first application; and submitting, by the first application, the login authorization information to a server of the second application through a server of the first application; and authorizing logging into the first application on the device.

20 Claims, 9 Drawing Sheets

(51) Int. Cl.
*G06F 3/0481* (2013.01)
*G06F 3/0482* (2013.01)
*G06F 3/0488* (2013.01)
*G06F 3/0486* (2013.01)

(52) U.S. Cl.
CPC ...... *G06F 3/04817* (2013.01); *G06F 3/04883* (2013.01); *G06F 21/33* (2013.01); *G06F 2203/04806* (2013.01); *G06F 2203/04808* (2013.01); *G06F 2221/2149* (2013.01)

(58) Field of Classification Search
USPC .......................................................... 726/2
See application file for complete search history.

(56) References Cited

U.S. PATENT DOCUMENTS

| | | | | |
|---|---|---|---|---|
| 8,875,289 | B2* | 10/2014 | Mahaffey | G06F 21/564 726/2 |
| 8,949,933 | B2* | 2/2015 | Nelson | G06F 21/6218 713/193 |
| 8,984,628 | B2* | 3/2015 | Mahaffey | G06F 21/564 726/22 |
| 9,720,584 | B2* | 8/2017 | Louch | G06F 3/0481 |
| 2003/0154110 | A1* | 8/2003 | Walter | G06F 19/3418 705/3 |
| 2006/0021004 | A1* | 1/2006 | Moran | H04L 63/08 726/2 |
| 2007/0180493 | A1* | 8/2007 | Croft | G06F 3/1415 726/2 |
| 2007/0180503 | A1* | 8/2007 | Li | H04L 63/06 726/5 |
| 2015/0363066 | A1 | 12/2015 | Lemay et al. | |
| 2016/0044019 | A1 | 2/2016 | Wilkes et al. | |
| 2017/0208049 | A1* | 7/2017 | Hu | H04W 4/12 |
| 2018/0062995 | A1* | 3/2018 | Naar | H04L 45/745 |
| 2018/0302390 | A1* | 10/2018 | Beecham | H04L 63/08 |

FOREIGN PATENT DOCUMENTS

| | | |
|---|---|---|
| CN | 105072133 | 11/2015 |
| CN | 105101205 | 11/2015 |
| CN | 105573615 | 5/2016 |
| CN | 105808095 | 7/2016 |
| CN | 106888202 | 6/2017 |

OTHER PUBLICATIONS

PCT International Preliminary Report on Patentability in International Application No. PCT/CN2017/113555, dated Jun. 11, 2019, 9 pages (with English translation).

* cited by examiner

METHOD AND APPARATUS FOR AUTHORIZED LOGIN

CROSS-REFERENCE TO RELATED APPLICATIONS

This application is a continuation of PCT Application No. PCT/CN2017/113555, filed on Nov. 29, 2017, which claims priority to Chinese Patent Application No. 201611124494.X, filed on Dec. 8, 2016, and each application is hereby incorporated by reference in its entirety.

TECHNICAL FIELD

The present application relates to the field of computer applications, and in particular, to a method and an apparatus for an authorized login.

BACKGROUND

An authorized login is a quick login mode that a user is authorized to directly log in to an application by using a login identity of another application that the user has successfully logged in to. However, in practice, when a user browses an application, if an authorized login needs to be performed to the current application by using a login identity of another application that the user has successfully logged in to, the user usually needs to perform a plurality of operations on a login page of the application to complete the login. Therefore, the interaction is relatively complex and is not convenient.

SUMMARY

The present application provides a method for an authorized login, where the method includes the following: zooming out a user interface of a first application in response to a zooming operation for the user interface of the first application; displaying an icon of at least one second application that a user has logged in to in a blank area generated after the user interface of the first application is zoomed out, where the first application pre-establishes an association with the second application; transmitting login authorization information of the second application to the first application in response to an operation of dragging the icon of the second application from the blank area to the zoomed-out user interface of the first application, so that the first application submits the login authorization information of the second application to a server of the second application by using a server of the first application for login authorization verification; and performing an authorized login to the first application in response to a notification message that is returned by the server of the second application through the server of the first application, where the notification message indicates that the login authorization information is verified.

The present application further provides an apparatus for an authorized login, where the apparatus includes the following: a zooming module, configured to zoom out a user interface of a first application in response to a zooming operation for the user interface of the first application; a display module, configured to display an icon of at least one second application that a user has logged in to in a blank area generated after the user interface of the first application is zoomed out, where the first application pre-establishes an association with the second application; a transmission module, configured to transmit login authorization informa- tion of the second application to the first application in response to an operation of dragging the icon of the second application from the blank area to the zoomed-out user interface of the first application, so that the first application submits the login authorization information of the second application to a server of the second application by using a server of the first application for login authorization verification; and a login module, configured to perform an authorized login to the first application in response to a notification message that is returned by the server of the second application through the server of the first application, where the notification message indicates that the login authorization information is verified.

In the present application, an interaction method that can be used to quickly complete an authorized login is provided. A user can perform a predetermined zooming operation on a user interface of a first application to trigger an operating system of a terminal device to zoom out the user interface of the first application. An icon of at least one second application that establishes an association with the first application and that the user has logged in to is displayed in a blank area generated after the user interface of the first application is zoomed out. Then the user drags the icon of the second application to the user interface of the first application to trigger the terminal device to transmit login authorization information of the second application to the first application, and the first application submits the login authorization information of the second application to a server of the second application by using a server of the first application for login authorization verification. After the verification succeeds, the user can log in to the second application by using the login authorization information of the first application. As such, the user can quickly complete the authorized login by using a simple and quick interacting operation, to reduce the operation complexity in performing the authorized login and improve user's interactive experience.

DESCRIPTION OF IMPLEMENTATIONS

In a related technology, when a user performs an authorized login to a currently browsed application by using a login identity of a third-party application that the user has successfully logged in to, the user usually needs to perform a plurality of operations on a login page of the application to complete the login. Therefore, the interaction is relatively complex and is not convenient.

Figure 1:
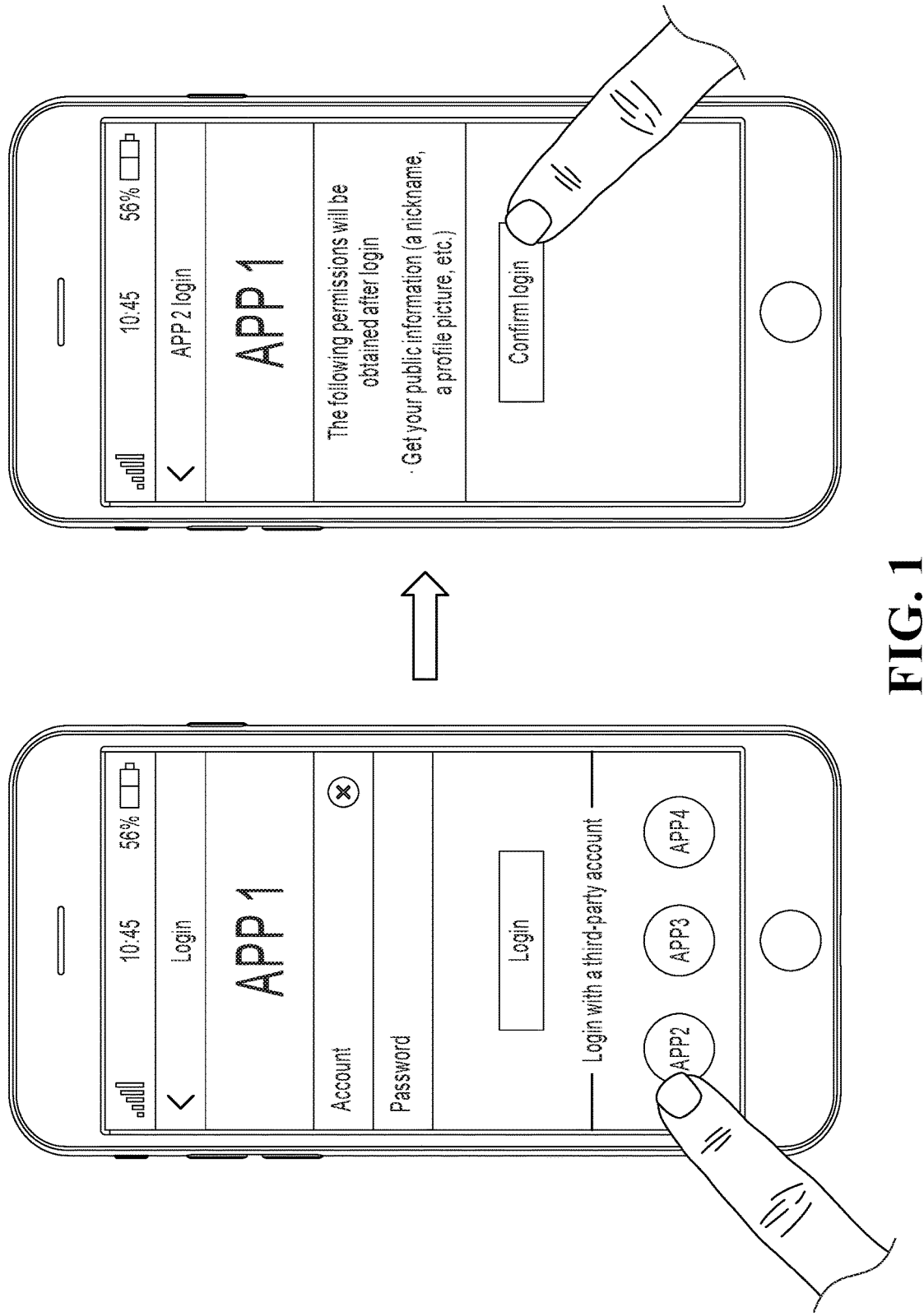
FIG. 1 is a schematic diagram illustrating interaction of performing an authorized login in a related technology, according to the present application.

For example, referring to FIG. 1, the application is an APP application of a mobile terminal. Usually, login entries that correspond to a plurality of third-party APPs can be set in a login interface of current APP 1. When the user needs to log in to APP 1 by using a login identity of third-party APP 2 that the user has successfully logged in to, the user can trigger a login entry that corresponds to APP 2 to jump to a login authorization page of APP 2, and further perform an interacting operation in the login authorization page. After confirming an operation of this authorized login, APP 1 can initiate login authorization verification to a server that corresponds to APP 2, to complete the authorized login to APP 1 by using the login identity of APP 2.

It can be seen that, in the related technology, if the user needs to perform an authorized login to the currently browsed application by using the login identity of the third-party application, the user needs to perform at least two operations: triggering the authorized login, and confirming the authorized login after a page jump, to complete the authorized login operation. Therefore, the interaction is relatively complex and is not convenient.

To alleviate the previous problem, an interaction method that can be used to quickly complete an authorized login is provided. A user can perform a predetermined zooming operation on a user interface of a first application to trigger an operating system of a terminal device to zoom out the user interface of the first application. An icon of at least one second application that establishes an association with the first application and that the user has logged in to is displayed in a blank area generated after the user interface of the first application is zoomed out. Then the user drags the icon of the second application to the user interface of the first application to trigger the terminal device to transmit login authorization information of the second application to the first application, and the first application submits the login authorization information of the second application to a server of the second application by using a server of the first application for login authorization verification. After the verification succeeds, the user can log in to the second application by using the login authorization information of the first application. As such, the user can quickly complete the authorized login by using a simple and quick interacting operation, to reduce the operation complexity in performing the authorized login and improve user's interactive experience.

The following describes the present application by using implementations with reference to application scenarios.

Figure 2:
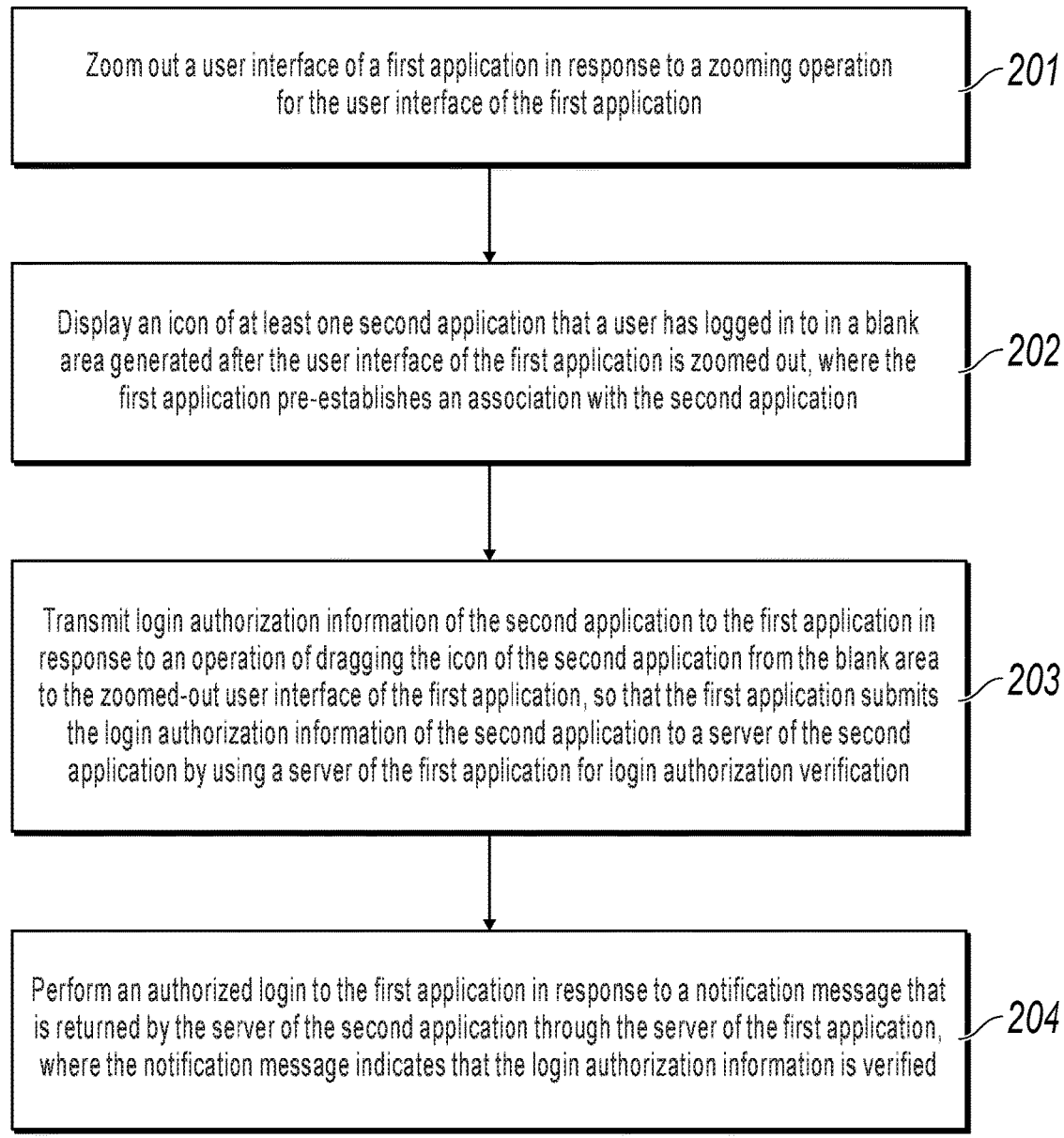
FIG. 2 is a flowchart illustrating a method for an authorized login, according to an implementation of the present application.

FIG. 2 shows a method for an authorized login, according to an implementation of the present application. The method is applied to an operating system of a terminal device, and the method includes the following steps.

Step 201: Zoom out a user interface of a first application in response to a zooming operation for the user interface of the first application.

Step 202: Display an icon of at least one second application that a user has logged in to in a blank area generated after the user interface of the first application is zoomed out, where the first application pre-establishes an association with the second application.

The terminal device can be a mobile terminal device, or can be a PC terminal device. For example, the terminal device can be a touchscreen smartphone, or can be a notebook computer or a tablet computer. The operating system of the terminal device can be IOS, ANDROID, WINDOWS, or another type of operating system.

The first application is an application that the user can be authorized to directly log in to by using a login identity of another third-party application. The second application is an application that the user has successfully logged in to and can provide an associated authorized login service for another application.

For example, in practice, the first application can be minority applications that have a relatively small number of users and have some characteristic functions. The second application can be applications that have a large number of users and can provide an associated authorized login service for other minority applications, for example, applications such as ALIPAY and WeChat.

In practice, the first application and the second application can be APP applications installed on the mobile terminal device, or can be Web applications installed on the PC terminal device. Implementations are not limited in the present example.

In an initial state, a server that corresponds to the first application and a server that corresponds to the second application can separately establish an association between the first application and the second application. The association can be a login association between the first application and the second application. After the login association between the first application and the second application is established on their respective servers of the first application and the second application, the servers that correspond to the first application and the second application provide the function permission to directly complete a login by using a login identity of each other.

In the present example, in a process that the user browses the first application, if the user needs to log in to the first application by using a login identity of a second application that the user has successfully logged in to and that is installed on the terminal device, the user can perform a predetermined zooming operation on the user interface of the first application to trigger the operating system of the terminal device (which is briefly referred to as the operating system below) to zoom out the user interface. After detecting the zooming operation, the operating system can zoom out the user interface based on a predetermined zooming-out percentage in response to the zooming operation.

The predetermined zooming operation can include a two-finger pinch gesture for the user interface, a predetermined trigger operation (such as a double-click operation or another type of operation) for the user interface, and a predetermined trigger operation for a predetermined virtual button (such as a zooming button) or an physical button (such as a fingerprint button or another physical button on the terminal device).

Figure 3:
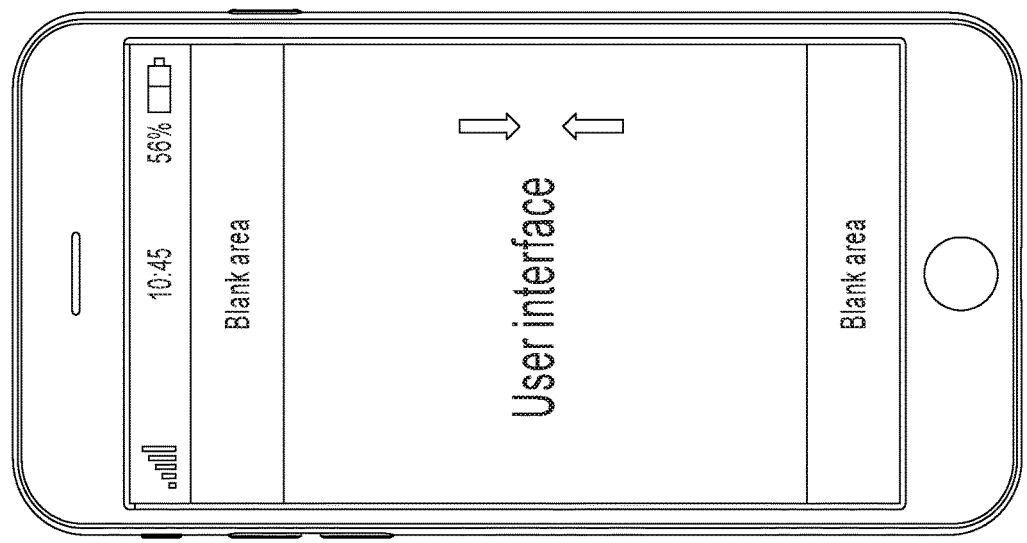
FIG. 3 is a schematic diagram illustrating interaction of zooming out a user interface, according to an implementation of the present application.
Figure 3:
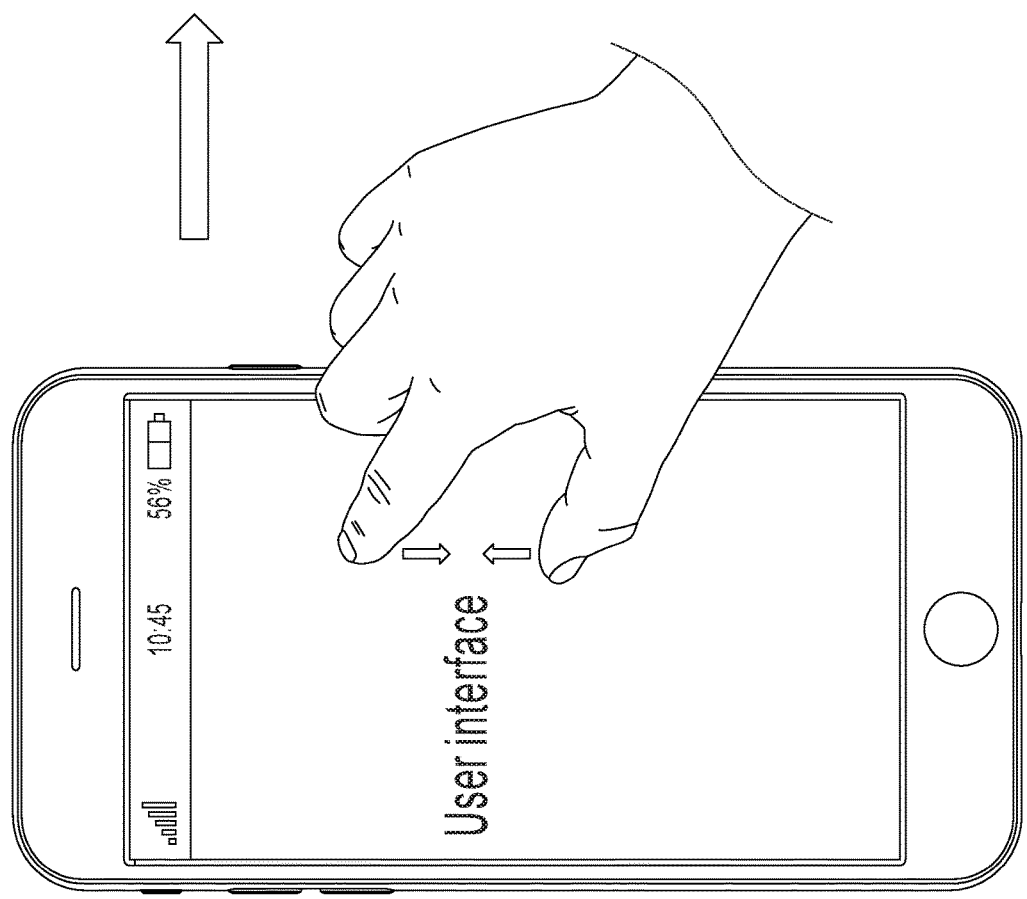

For example, referring to FIG. 3, when the terminal device is a touchscreen device, the user can perform a two-finger pinch gesture shown in FIG. 3 on a currently displayed user interface of the first application to trigger the operating system to zoom out the user interface.

When the terminal device is a non-touchscreen device, in a case, a zooming button can be set in a currently displayed user interface of the first application, and the user can double click the zooming button to trigger the operating system to zoom out the user interface; or in another case, an event of zooming out the user interface can be predefined in the operating system as a trigger event of performing a double-click operation on a fingerprint button of the terminal device, and the operating system can zoom out the user interface in response to the double-click operation when detecting the double-click operation performed by the user on the fingerprint button.

In the present example, after zooming out the user interface based on the predetermined percentage in response to the zoom operation performed by the user on the user interface of the first application, the operating system can display icons of a plurality of second applications that pre-establish an association with the first application in the blank area generated after the user interface is zoomed out.

A size of the blank area can be adjusted synchronously by adjusting the zooming percentage. The number of icons of second applications displayed in the blank area can also be customized based on the number of second applications that actually establish an association with the first application.

Figure 4:
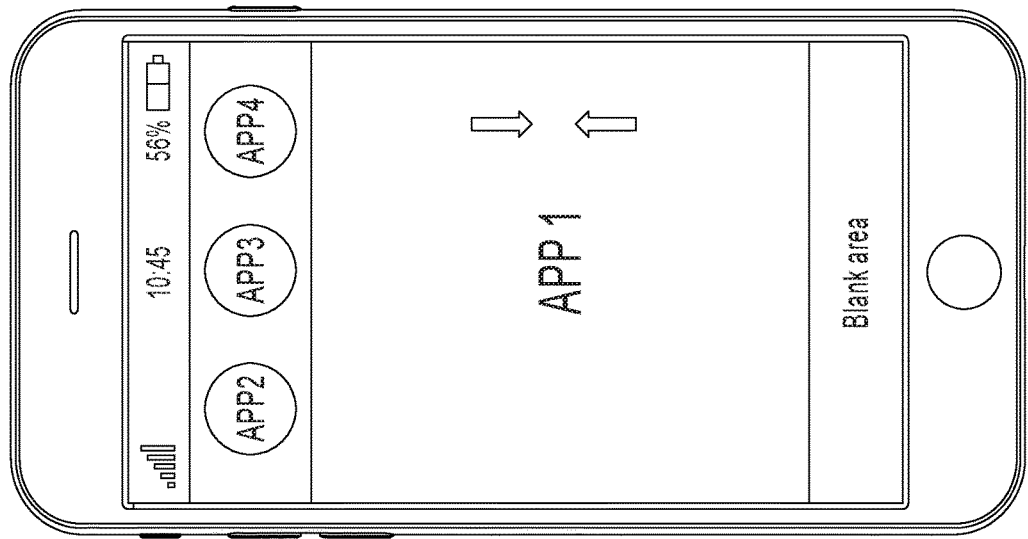
FIG. 4 is a schematic diagram illustrating interaction of displaying an icon of an associated application in a blank area of a zoomed-out user interface, according to an implementation of the present application.
Figure 4:
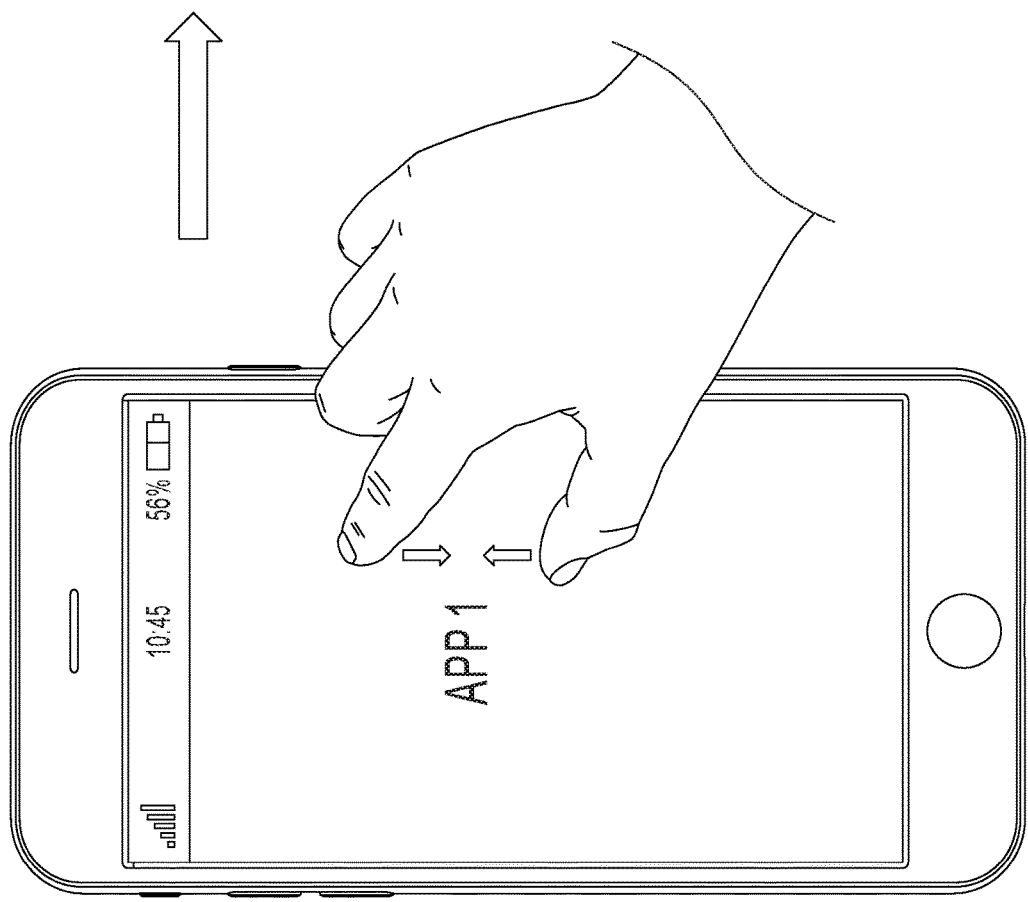

For example, referring to FIG. 4, assume that the first application is APP 1, and the second application includes APP 2, APP 3, and APP 4. When the user performs a predetermined zooming operation on a user interface of APP 1 to trigger the operating system to zoom out the user interface based on a predetermined percentage, APP 2, APP 3, and APP 4 can be displayed at any location in a blank area generated after the user interface of APP 1 is zoomed out (FIG. 4 shows a blank area displayed above the zoomed-out user interface).

Step 203: Transmit login authorization information of the second application to the first application in response to an operation of dragging the icon of the second application from the blank area to the zoomed-out user interface of the first application, so that the first application submits the login authorization information of the second application to a server of the second application by using a server of the first application for login authorization verification.

Step 204: Perform an authorized login to the first application in response to a notification message that is returned by the server of the second application through the server of the first application, where the notification message indicates that the login authorization information is verified.

In the present example, after the operating system displays the icons of the plurality of second applications that establish an association with the first application in the blank area generated after the user interface of the first application is zoomed out, the user can directly drag the icon of the second application displayed in the control area to an area where the zoomed-out user interface of the first application is located, to trigger the operating system to transmit the login authorization information of the dragged second application to the first application.

The login authorization information can include an application identifier (such as an APP ID) of the second application, a user identifier (such as a UID) allocated by the server of the second application to the user after the user successfully logs in to the second application, and a login certificate (such as a token certificate) sent by the server of the second application after the user successfully logs in to the second application.

For example, in practice, after the user successfully logs in to an application by entering a login account and a password, a server of the application usually allocates a corresponding UID to the user, and sends a corresponding token certificate to the application. The UID is used to uniquely identify an identity of the user. The token certificate usually is a random string calculated based on a predetermined token algorithm, and is used to verify the login identity of the user. In this case, the login authorization information can include the application identifier of the second application, the UID allocated to the user after the user successfully logs in to the second application, and the token certificate.

In the present example, an open interface (API) can be preconfigured in the second application to implement data communication between the first application and the second application, and the open interface is used to transmit data between applications.

When detecting an operation of dragging, by the user, an icon of any second application displayed in the blank area to the zoomed-out user interface of the first application, the operating system can invoke the open interface preconfigured in the second application, then use login authorization information used by the user to log in to the second application as an invocation parameter, and transmit the invocation parameter to the second application.

In the present example, after the user successfully transmits the login authorization information of the second application to the first application by dragging the icon of any second application in the blank area, the first application can interact with the server of the first application based on a connection pre-established between the first application and the server of the first application, to submit the login authorization information of the second application to the server of the first application.

After receiving the login authorization information of the second application, the server of the first application can continue to submit the login authorization information of the second application to the server of the second application for login authorization verification by using a data transmission invoking mechanism between the servers because a login association is also pre-established between the server of the first application and the server of the second application.

After the login authorization information transmitted by the server of the first application is verified, the server of the second application can return a notification message of "verification succeeds" to the server of the first application. After receiving the notification message, the server of the first application can set the first application to a login state by using personal information (such as the user's UID and personal data) used when the user logs in to the second application, and then continue to send the notification message to the operating system. Similarly, after receiving the notification message, the operating system can also invoke, at a system level, the personal information used when the user logs in to the second application, to automatically log in to the first application.

Figure 5:
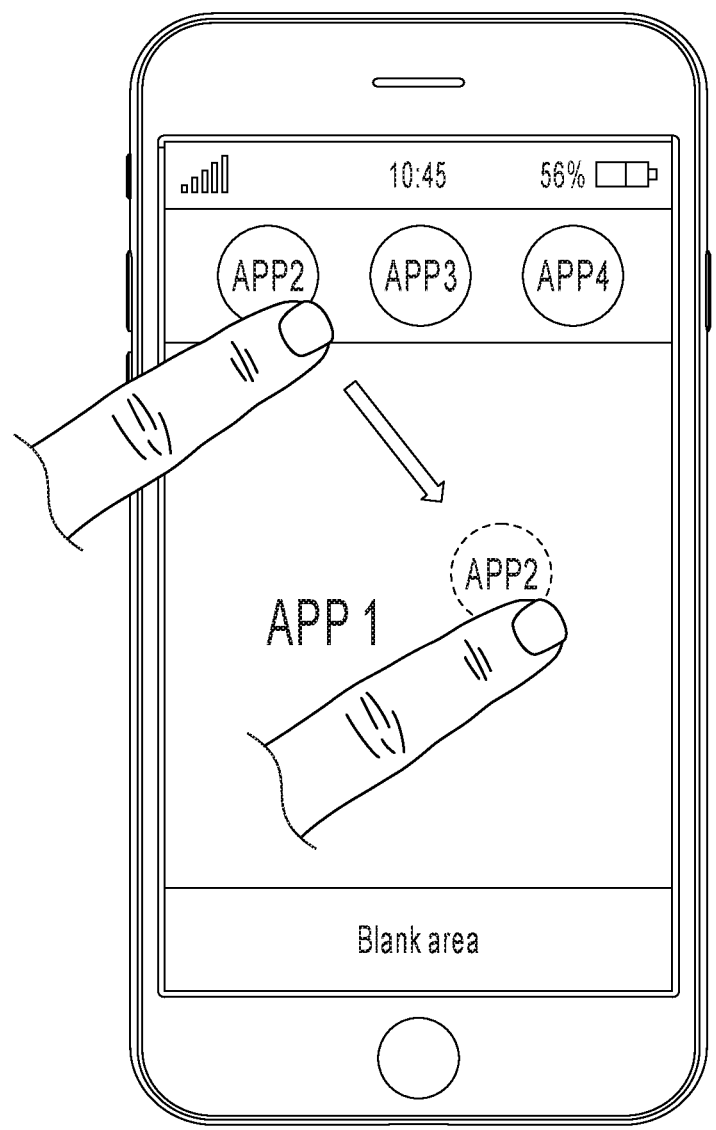
FIG. 5 is a schematic diagram illustrating interaction of an authorized login, according to an implementation of the present application.

For example, referring to FIG. 5, assume that the first application is APP 1, the second application includes APP 2, APP 3, and APP 4, and icons of APP 2, APP 3, and APP 4 are displayed in a blank area generated after a user interface of APP 1 is zoomed out. Assume that the user needs to perform an authorized login to APP 1 by using a login identity of APP 2. In this case, the user can drag the icon of APP 2 to the zoomed-out user interface of APP 1. After detecting an operation of dragging the icon of APP 2 to the zoomed-out user interface of APP 1, the operating system can invoke the open interface preconfigured in APP 1, use an APP ID of APP 2, a UID allocated by a server of APP 2 to the user, and a token certificate sent by the server of APP 2 as invocation parameters, and transmit the invocation parameters to APP 1 by using the open interface. Then APP 1 can continue to submit, to the server of APP 2 by using a server of APP 1 for verification, the APP ID of APP 2, the UID allocated by the server of APP 2 to the user, and the token certificate sent by the server of APP 2. When confirming through verification that the token certificate is valid, the server of APP 2 can return a notification message of "verification succeeds" to the server of APP 1. Then the server of APP 1 can fetch personal information reserved by the user on the server of APP 2 to complete the login authorization, and send the notification message to the operating system. After receiving the notification message, the operating system can also fetch the personal information used by the user to log in to APP 2 to automatically log in to APP 1.

Certainly, after the operating system invokes the personal information used when the user logs in to the second application to automatically log in to the first application for completing the authorized login, the operating system can further restore the user interface of the first application to a default size.

It can be seen that, in this method, a user can drag an icon of a third-party application displayed in a blank area in a zoomed-out user interface of a current application to the user interface of the current application, so that a login authorization operation can be quickly performed on the current application by using a login identity of the third-party application. Therefore, the operation complexity in performing an authorized login can be reduced, and user's interactive experience can be improved.

In the present example, after the operating system zooms out the user interface of the first application in response to the zooming operation performed by the user on the user interface of the first application, and displays the icons of the plurality of second applications that pre-establish a login association with the first application in the blank area generated after the user interface of the first application is zoomed out, the user can drag an icon of any second application in the blank area to the zoomed-out user interface of the first application in an interaction method described above to quickly perform login authorization on the first application by using a login identity of the user on the second application. In addition, in practice, the user can also drag a target object of a specified type currently displayed in the zoomed-out user interface of the first application to an area where any icon displayed in the blank area is located, and quickly transmit the target object to a second application that corresponds to the icon, to share a file of the target object.

The target object can include any type of file that can be transmitted between applications, such as a text, a picture, a link, a video, or a commodity displayed in the user interface of the first application. In practice, backend developers of the first application can further limit in advance a type of the target object that needs to be transmitted between applications.

For example, in practice, backend developers of the first application can specify, for the first application based on actual needs, a type of a file that can be transmitted to another application. If the developers specify a picture and a text as files that can be transmitted, only a text and a picture displayed in the user interface of the application can respond to an operation of dragging, by the user, the target object to an area where an icon of another application is located.

In the present example, one open interface can be preconfigured in each second application that pre-establishes a login association with the first application. After detecting an operation of dragging, by the user, a target object of a specified type displayed in the user interface of the first application to an area where an icon of any second application displayed in the blank area is located, the operating system can invoke the open interface of the second application, use the target object as an invocation parameter, and transmit the invocation parameter to the second application for further processing by the second application.

Figure 6:
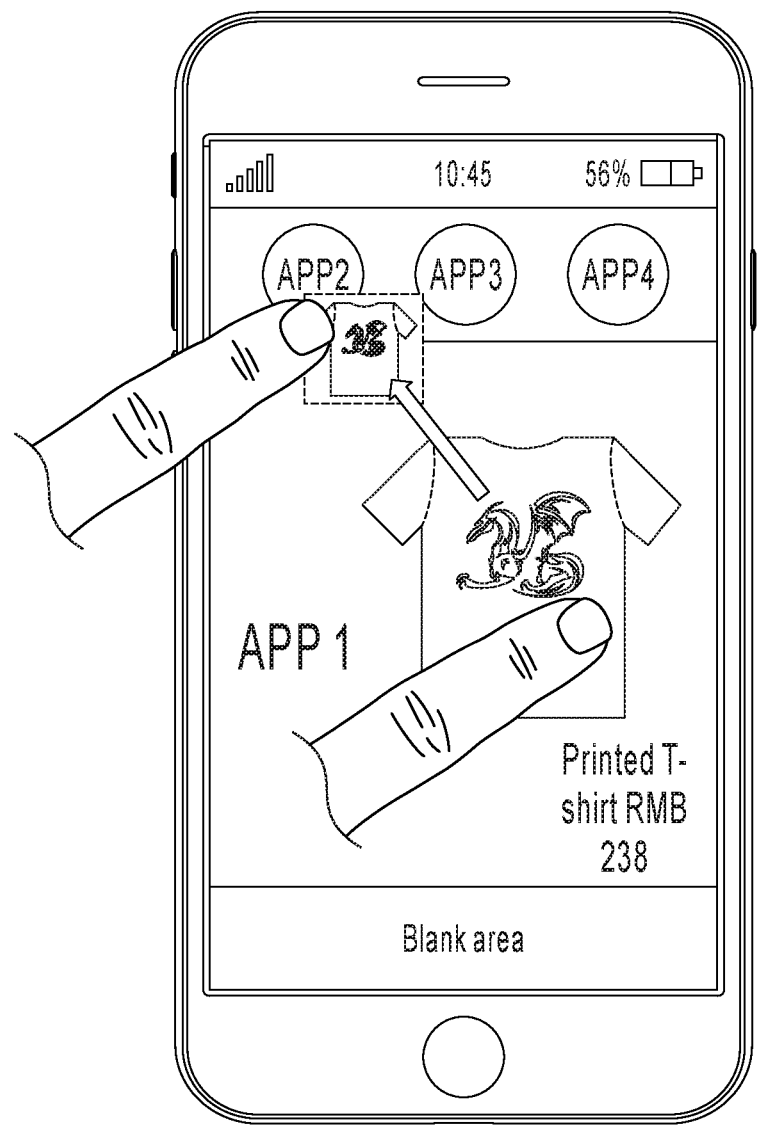
FIG. 6 is a schematic diagram illustrating interaction of transmitting a target object between applications in an authorized login scenario, according to an implementation of the present application.

For example, referring to FIG. 6, assume that the first application is APP 1, the second application includes APP 2, APP 3, and APP 4, and icons of APP 2, APP 3, and APP 4 are displayed in a blank area generated after a user interface of APP 1 is zoomed out. Assume that the user needs to quickly share a commodity picture displayed in the user interface of APP 1 with APP 2. In this case, the user can drag the commodity picture displayed in the user interface of APP 1 to an area where the icon of APP 2 in the blank area is located. After detecting the operation of dragging the commodity picture to the area where the icon of APP 2 is located, the operating system can invoke the open interface preconfigured in APP 2, use the commodity picture as an invocation parameter, and transmit the invocation parameter to APP 2 by using the open interface for further processing by APP 2.

It is worthwhile to note that a method that the second application further processes the transmitted target object usually depends on processing logic loaded in the open interface, and can include an operation such as storing the transmitted target object locally or performing further forwarding. In practice, backend developers of the second application can independently develop the open interface based on actual needs.

For example, still referring to FIG. 6, assume that APP 2 is an email application, and the user needs to transmit the commodity picture displayed in the user interface of APP 1 to APP 2 in a form of an attachment in an email. In this case, when developing the open interface of APP 2, the developers of APP 2 can add execution logic of "sending a file transmitted to the APP in a form of an attachment" to a structure of the open interface. When receiving the commodity picture transmitted by APP 1, APP 2 can immediately run the execution logic to jump to an email sending page, and add the commodity picture to the email sending page in a form of an attachment.

It can be seen that, in this method, a user can drag a target object displayed in a zoomed-out user interface of a current application to an area where an icon of a third-party application displayed in a blank area is located, so that the target object can be quickly shared with the third-party application. Therefore, the efficiency of sharing a file between applications can be improved.

The present application further provides an apparatus implementation that corresponds to the previous method implementation.

Figure 7:
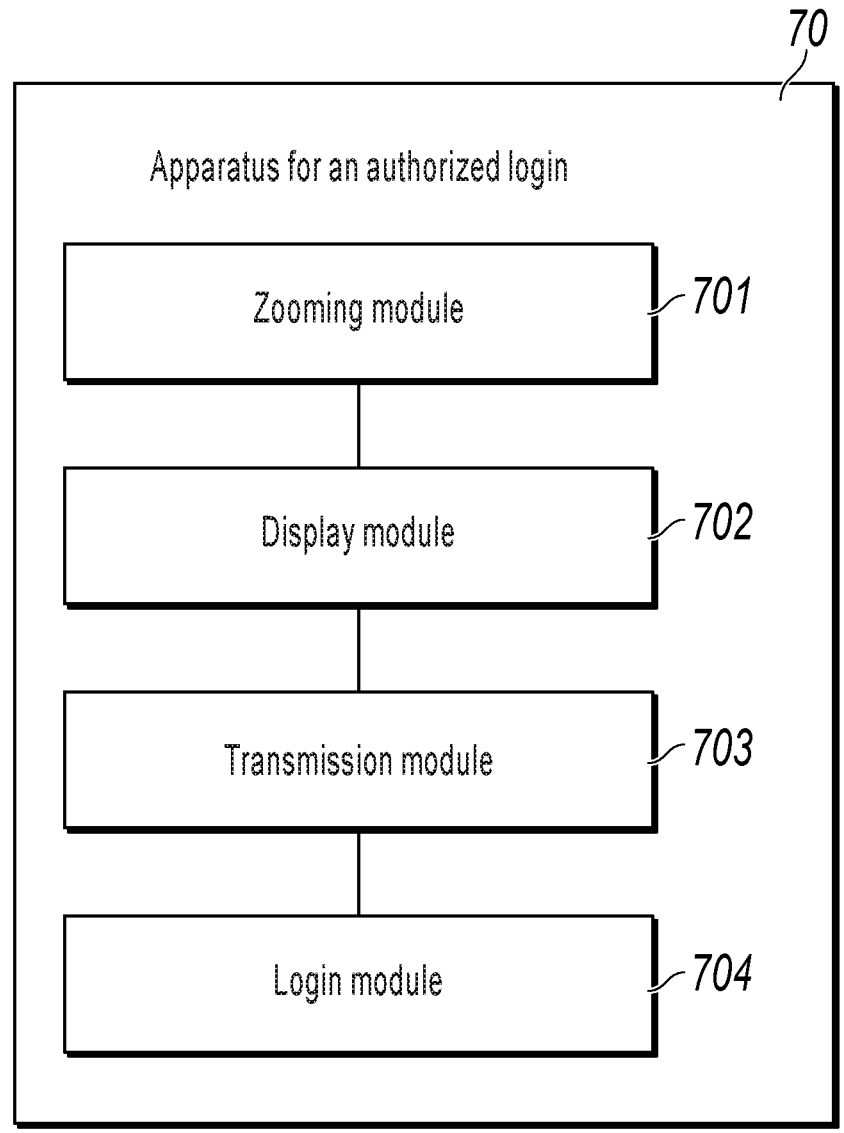
FIG. 7 is a logical block diagram illustrating an apparatus for an authorized login, according to an implementation of the present application.
Figure 8:
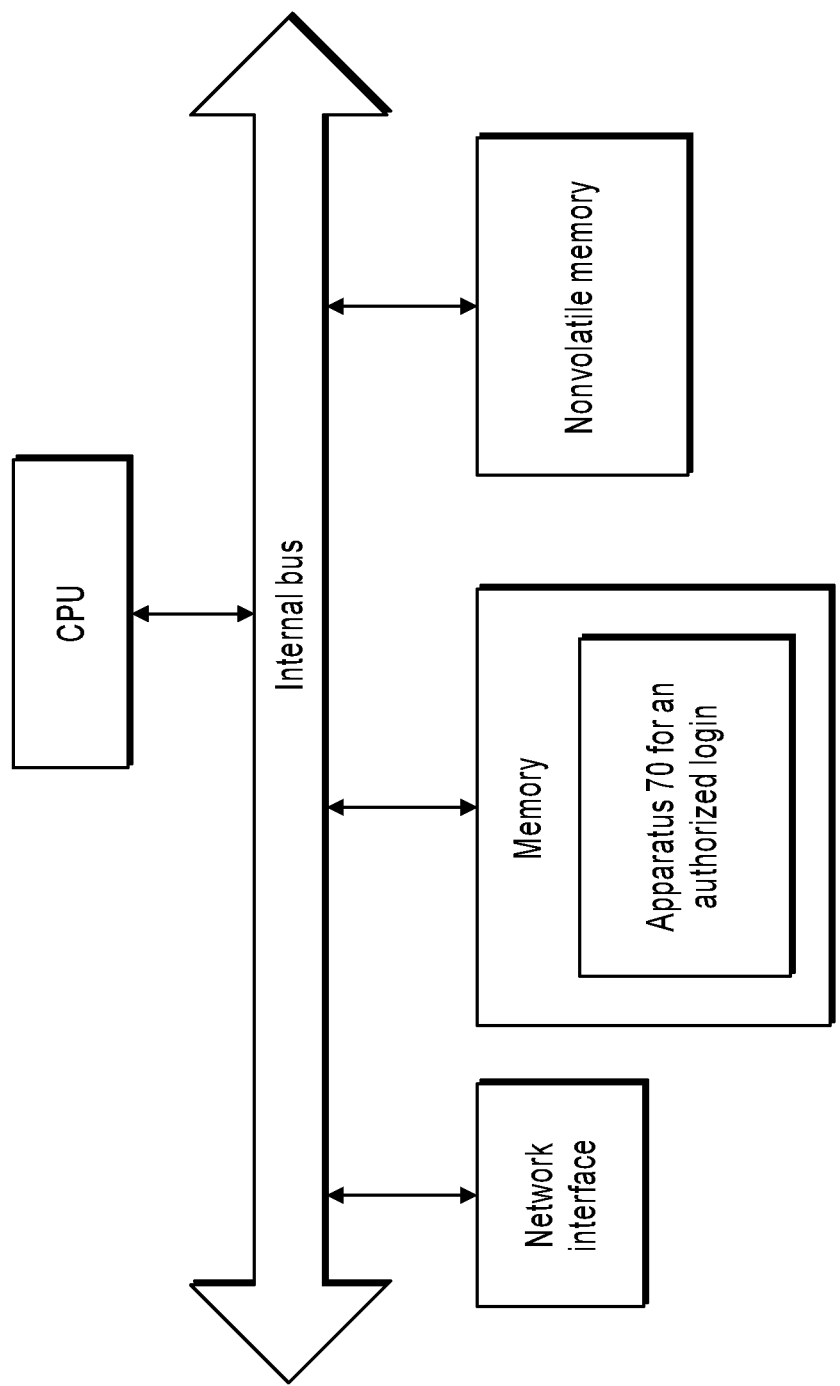
FIG. 8 is a structural diagram illustrating hardware of a terminal device that includes the apparatus for an authorized login, according to an implementation of the present application.

Referring to FIG. 7, the present application provides an apparatus 70 for an authorized login, where the apparatus is applied to a terminal device. Referring to FIG. 8, a hardware architecture of the terminal device that includes the apparatus 70 for an authorized login usually includes a CPU, a memory, a nonvolatile memory, a network interface, an internal bus, etc. For example, in software implementation, the apparatus 70 for an authorized login usually can be understood as a logical apparatus that combines software and hardware after a computer program loaded in the memory runs in the CPU. The apparatus 70 includes the following: a zooming module 701, configured to zoom out a user interface of a first application in response to a zooming operation for the user interface of the first application; a display module 702, configured to display an icon of at least one second application that a user has logged in to in a blank area generated after the user interface of the first application is zoomed out, where the first application pre-establishes an association with the second application; a transmission module 703, configured to transmit login authorization information of the second application to the first application in response to an operation of dragging the icon of the second application from the blank area to the zoomed-out user interface of the first application, so that the first application submits the login authorization information of the second application to a server of the second application by using a server of the first application for login authorization verification; and a login module 704, configured to perform an authorized login to the first application in response to a notification message that is returned by the server of the second application through the server of the first application, where the notification message indicates that the login authorization information is verified.

In the present example, the zooming module 701 is further configured to: restore the user interface of the first application to a default size after successfully logging in to the first application based on the login authorization information of the second application.

In the present example, the transmission module 703 is further configured to: in response to an operation of dragging a target object of a specified type displayed in the zoomed-out user interface of the first application to an area where any icon in the blank area is located, transmit the target object to a second application that corresponds to the icon, so that the second application further processes the target object.

In the present example, the transmission module 703 is further configured to: invoke an open interface of the first application, use the login authorization information of the second application as an invocation parameter, and transmit the invocation parameter to the first application; and invoke an open interface of the second application that corresponds to the icon, use the target object as an invocation parameter, and transmit the invocation parameter to the second application that corresponds to the icon.

In the present example, the first application and the second application include: an APP application and a Web application.

The zooming operation includes the following: a two-finger pinch gesture for the user interface of the first application; a predetermined trigger operation for the user interface of the first application; and a predetermined trigger operation for a predetermined virtual button or a physical button.

In the present example, the login authorization information includes: an application identifier of the second application, a user identifier allocated by the server of the second application to the user after the user successfully logs in to the second application, and a login certificate sent by the server of the second application after the user successfully logs in to the second application.

Because an apparatus implementation basically corresponds to a method implementation, for related parts, references can be made to related descriptions in the method implementation. The previously described apparatus implementation is merely an example. The units described as separate parts may or may not be physically separate, and parts displayed as units may or may not be physical units, may be located in one position, or may be distributed on a plurality of network units. Some or all of the modules can be selected based on actual needs to achieve the objectives of the solutions in the present application. A person of ordinary skill in the art can understand and implement the implementations of the present application without creative efforts.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

A person skilled in the art can easily figure out another implementation solution of the present application after considering the present specification and practicing the disclosed invention here. The present application is intended to cover any variations, functions, or adaptive changes of the present application. These variations, functions, or adaptive changes comply with general principles of the present application, and include common knowledge or a commonly used technical means in the technical field that is not disclosed in the present application. The present specification and the implementations are merely considered as examples. The actual scope and the spirit of the present application are pointed out by the following claims.

It should be understood that the present application is not limited to the accurate structures described above and shown in the accompanying drawings, and modifications and changes can be made without departing from the scope of the present application. The scope of the present application is limited only by the appended claims.

The previous descriptions are merely examples of implementations of the present application, but are not intended to limit the present application. Any modification, equivalent replacement, or improvement made without departing from the spirit and principle of the present application should fall within the protection scope of the present application.

Figure 9:
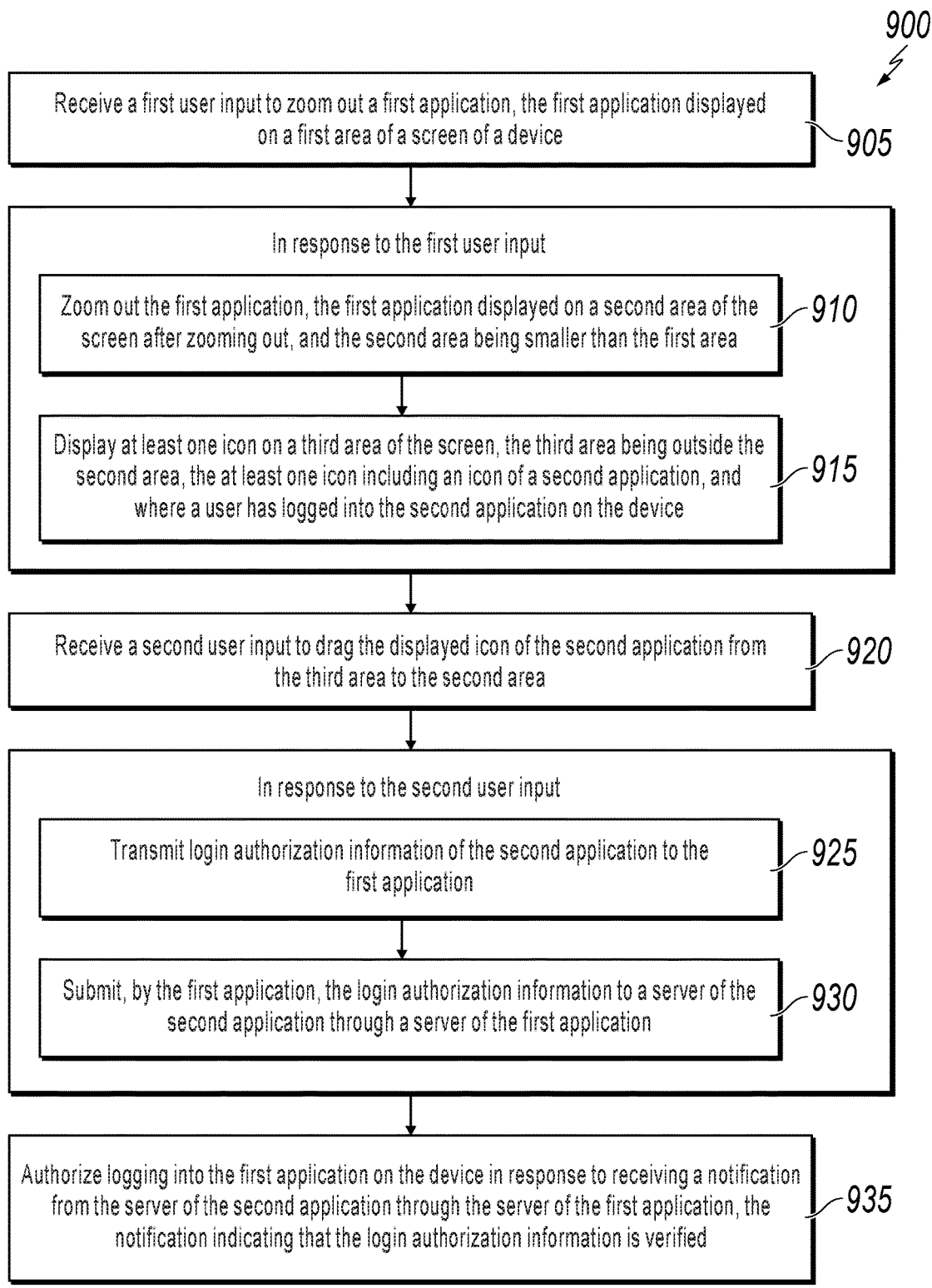
FIG. 9 is a flowchart illustrating an example of a computer-implemented method for performing an authorized login, according to an implementation of the present disclosure.

FIG. 9 is a flowchart illustrating an example of a computer-implemented method 900 for performing an authorized login, according to an implementation of the present disclosure. For clarity of presentation, the description that follows generally describes method 900 in the context of the other figures in this description. However, it will be understood that method 900 can be performed, for example, by any system, environment, software, and hardware, or a combination of systems, environments, software, and hardware, as appropriate. In some implementations, various steps of method 900 can be run in parallel, in combination, in loops, or in any order.

At 905, a first user input to zoom out a first application is received. The first application is displayed on a first area of a screen of a device. In some implementations, the first area can be a default displaying area of the screen. For example, the first area of the screen can be the entire displaying area of the screen, and the displayed first application occupies the entire first area of the screen. In some implementations, the displayed first application can occupy most of the entire displaying area of the screen in order to display one or more indicators (such as, current time and battery life).

In some implementations, the device can be a mobile device, or a personal computer (PC). For example, the device can be a touchscreen smartphone, a laptop, or a tablet. The operating system of the device can be IOS, ANDROID, WINDOWS, or another type of operating system. The screen can be a touchscreen or a non-touchscreen. If the screen is a touchscreen, the first user input can be a touch gesture on the touchscreen (such as, a two-finger pinch gesture on the displayed first application, and a predetermined trigger operation on the displayed first application). If the screen is a non-touchscreen, the first user input can be an input through, for example, a mouse or a keyboard (such as, a predetermined trigger operation on a virtual or physical button).

In some implementations, the first application can be an application (APP) installed on, for example, a mobile device (that is, a mobile application). In some implementations, the first application can be a Web application installed on, for example, a PC. The first application can be an application that a user can be authorized to directly log into using a login identity of a third-party application. For example, the first application can be an application that has a small number of users. In response to receiving the first user input, steps 910 and 915 are automatically performed.

At 910, the first application is zoomed out. The first application is displayed on a second area of the screen after the first application is zoomed out. The second area is smaller than the first area. For example, the second area of the screen can be part of the displaying area of the screen, and the displayed first application after zooming out occupies the entire second area of the screen. From 910, method 900 proceeds to 915.

At 915, at least one icon is displayed on a third area of the screen. The third area is outside the second area. For example, the third area of the screen can be an area of the screen that is occupied by the displayed first application before zooming out, and is not occupied by the displayed first application after zooming out. In other words, the third area can be a blank area on the screen generated after the displayed first application is zoomed out. The at least one icon includes an icon of a second application.

In some implementations, the second application is an APP or a Web application. The second application can be an application that can provide an associated authorized login service for other applications (such as, the first application). For example, the second application can be an application that has a large number of users (such as, ALIPAY and WeChat). A user has logged into the second application on the device when receiving the first user input. In some implementations, the user has not logged into the first application on the device when receiving the first user input. In some implementations, an association between the first application and the second application has been pre-established before receiving the first user input. The association can be a login association between the first application and the second application. The association can established by a server of the first application and a server of the second application. From 915, method 900 proceeds to 920.

At 920, a second user input to drag the displayed icon of the second application from the third area to the second area is received. For example, the displayed icon of the second application is dragged to the displayed first application. In response to receiving the second user input, steps 925 and 930 are automatically performed.

At 925, login authorization information of the second application is transmitted to the first application. In some implementations, the login authorization information includes at least one of an application identifier (APP ID) of the second application, a user identifier (UID) assigned by the server of the second application to the user after the user logged into the second application, and a login certificate (such as, a token certificate) sent by the server of the second application after the user logged into the second application. In some implementations, the login authorization information is transmitted through an application program interface (API). For example, the second application can preconfigure the API for data communication between the first application and the second application. From 925, method 900 proceeds to 930.

At 930, the login authorization information is submitted by the first application to the server of the second application through the server of the first application. For example, the first application submits the login authorization information to the server of the first application. Then, the server of the first application submits the login authorization information to the server of the second application for login authorization verification. From 930, method 900 proceeds to 935.

At 935, logging into the first application on the device is authorized in response to receiving a notification from the server of the second application through the server of the first application. The notification indicates that the login authorization information is verified. For example, after receiving the login authorization information, the server of the second application verifies the login authorization information, and transmits the notification to the server of the first application. The server of the first application then transmits the notification to the first application. In some implementations, the server of the first application can set the first application to a login state using, for example, user information (such as, UID and personal information) that the user used to log into the second application.

In some implementations, the first application is displayed on the first area of the screen after successfully logging into the first application. For example, the displayed first application is returned to a displaying setting used when receiving the first user input. In some implementations, a third user input is received after successfully logging into the first application. The third user input is to drag an object displayed in the first application, displayed on the second area of the screen, to the displayed icon of the second application. In response to the third user input, the object is transmitted to the second application for further processing of the object. After 935, method 900 stops.

A third-party application can be used to perform an authorized login to a currently browsed application. Normally, when a user has successfully logged into a second application, a login identity of the second application can be used to perform an authorized login to a first application. However, the user may have to perform multiple complex operations on a login page of the first application to complete the login, which is not convenient for the user. The subject matter described in this specification provides a simple and quick authorized login method. For example, a user can zoom out of a displayed first application to display an icon of the second application. Then, the user can drag the icon of the second application to the displayed first application to complete an authorized login to the first application. In doing so, the user can perform a couple of simple and quick operations to perform an authorized login. As a result, complexity of an authorized login operation is decreased, thereby improving user experience when performing an authorized login.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   receiving a first user input to zoom out a first application, wherein the first application is displayed on a first area of a screen of a device before receiving the first user input;
   in response to the first user input:
      zooming out the first application, wherein the first application is displayed on a second area of the screen after zooming out the first application, and the second area is smaller than the first area; and
      displaying at least one icon on a third area of the screen, wherein the third area is outside the second area, the at least one icon includes an icon of a second application, and a user has logged into the second application on the device;
   receiving a second user input to drag the displayed icon of the second application from the third area to the second area;
   in response to the second user input:
      transmitting login authorization information of the second application to the first application; and
      submitting, by the first application, the login authorization information to a server of the second application through a server of the first application; and
   authorizing logging into the first application on the device in response to receiving a notification from the server of the second application through the server of the first application, wherein the notification indicates that the login authorization information is verified.

2. The computer-implemented method of claim 1, wherein the first application is not logged into by the user on the device when receiving the first user input, and the server of the second application is used for login authorization verification.

3. The computer-implemented method of claim 1, wherein an association between the first application and the second application has been pre-established before receiving the first user input.

4. The computer-implemented method of claim 1, wherein the login authorization information includes at least one of an application identifier of the second application, a user identifier assigned by the server of the second application to the user after the user logged into the second application, and a login certificate sent by the server of the second application after the user logged into the second application.

5. The computer-implemented method of claim 1, further comprising displaying the first application on the first area of the screen after successfully logging into the first application.

6. The computer-implemented method of claim 1, wherein the first application and the second application include a mobile application and a Web application, and the first user input includes a two-finger pinch gesture on the displayed first application, a predetermined trigger operation on the displayed first application, and a predetermined trigger operation on a virtual or physical button.

7. The computer-implemented method of claim 1, further comprising:
   receiving a third user input to drag an object displayed in the first application, displayed on the second area of the screen, to the displayed icon of the second application; and
   in response to the third user input, transmitting the object to the second application for further processing of the object.

8. A non-transitory, computer-readable medium storing one or more instructions executable by a computer system to perform operations comprising:
   receiving a first user input to zoom out a first application, wherein the first application is displayed on a first area of a screen of a device before receiving the first user input;
   in response to the first user input:
      zooming out the first application, wherein the first application is displayed on a second area of the screen after zooming out the first application, and the second area is smaller than the first area; and
      displaying at least one icon on a third area of the screen, wherein the third area is outside the second area, the at least one icon includes an icon of a second application, and a user has logged into the second application on the device;
   receiving a second user input to drag the displayed icon of the second application from the third area to the second area;
   in response to the second user input:
      transmitting login authorization information of the second application to the first application; and
      submitting, by the first application, the login authorization information to a server of the second application through a server of the first application; and
   authorizing logging into the first application on the device in response to receiving a notification from the server of the second application through the server of the first application, wherein the notification indicates that the login authorization information is verified.

9. The non-transitory, computer-readable medium of claim 8, wherein the first application is not logged into by the user on the device when receiving the first user input, and the server of the second application is used for login authorization verification.

10. The non-transitory, computer-readable medium of claim 8, wherein an association between the first application and the second application has been pre-established before receiving the first user input.

11. The non-transitory, computer-readable medium of claim 8, wherein the login authorization information includes at least one of an application identifier of the second application, a user identifier assigned by the server of the second application to the user after the user logged into the second application, and a login certificate sent by the server of the second application after the user logged into the second application.

12. The non-transitory, computer-readable medium of claim 8, the operations further comprising displaying the first application on the first area of the screen after successfully logging into the first application.

13. The non-transitory, computer-readable medium of claim 8, wherein the first application and the second application include a mobile application and a Web application, and the first user input includes a two-finger pinch gesture on the displayed first application, a predetermined trigger operation on the displayed first application, and a predetermined trigger operation on a virtual or physical button.

14. The non-transitory, computer-readable medium of claim 8, the operations further comprising:
receiving a third user input to drag an object displayed in the first application, displayed on the second area of the screen, to the displayed icon of the second application; and
in response to the third user input, transmitting the object to the second application for further processing of the object.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving a first user input to zoom out a first application, wherein the first application is displayed on a first area of a screen of a device before receiving the first user input;
in response to the first user input:
zooming out the first application, wherein the first application is displayed on a second area of the screen after zooming out the first application, and the second area is smaller than the first area; and
displaying at least one icon on a third area of the screen, wherein the third area is outside the second area, the at least one icon includes an icon of a second application, and a user has logged into the second application on the device;
receiving a second user input to drag the displayed icon of the second application from the third area to the second area;
in response to the second user input:
transmitting login authorization information of the second application to the first application; and
submitting, by the first application, the login authorization information to a server of the second application through a server of the first application; and
authorizing logging into the first application on the device in response to receiving a notification from the server of the second application through the server of the first application, wherein the notification indicates that the login authorization information is verified.

16. The system of claim 15, wherein the first application is not logged into by the user on the device when receiving the first user input, and the server of the second application is used for login authorization verification.

17. The system of claim 15, wherein an association between the first application and the second application has been pre-established before receiving the first user input.

18. The system of claim 15, wherein the login authorization information includes at least one of an application identifier of the second application, a user identifier assigned by the server of the second application to the user after the user logged into the second application, and a login certificate sent by the server of the second application after the user logged into the second application.

19. The system of claim 15, the operations further comprising displaying the first application on the first area of the screen after successfully logging into the first application.

20. The system of claim 15, wherein the first application and the second application include a mobile application and a Web application, and the first user input includes a two-finger pinch gesture on the displayed first application, a predetermined trigger operation on the displayed first application, and a predetermined trigger operation on a virtual or physical button.

* * * * *